(12) United States Patent
Perez

(10) Patent No.: US 8,935,988 B1
(45) Date of Patent: Jan. 20, 2015

(54) EMERGENCY BALLOON SYSTEM FOR ROADS

(76) Inventor: Jose Praxistelez Perez, Downey, CA (US)

( * ) Notice: Subject to any disclaimer, the term of this patent is extended or adjusted under 35 U.S.C. 154(b) by 343 days.

(21) Appl. No.: 13/492,548

(22) Filed: Jun. 8, 2012

(51) Int. Cl.
*E01F 9/012* (2006.01)

(52) U.S. Cl.
USPC ............ 116/63 P; 116/DIG. 8; 40/591

(58) Field of Classification Search
CPC ............ G09F 15/0025; G09F 15/0062; G09F 15/0075; G09F 15/0087; G09F 19/02; G09F 19/08; G09F 19/22; G09F 19/228; G09F 21/04; E01F 9/012; E01F 9/0122; A63H 3/06
USPC ............ 116/28 R, 63 P, 209, DIG. 7, DIG. 8, 116/DIG. 9; 40/412, 591, 610, 612; 362/96; 446/220, 223, 226
See application file for complete search history.

(56) References Cited

U.S. PATENT DOCUMENTS

| | | | | |
|---|---|---|---|---|
| 1,285,940 A | * | 11/1918 | Chodakowski | 343/880 |
| 2,498,270 A | * | 2/1950 | Hawley | 40/477 |
| 3,197,628 A | * | 7/1965 | Schuff | 362/157 |
| 4,607,444 A | * | 8/1986 | Foster | 40/550 |
| 4,876,812 A | * | 10/1989 | Haralson | 40/592 |
| 5,117,344 A | | 5/1992 | Perez | |
| 5,156,274 A | * | 10/1992 | Williams et al. | 206/573 |
| 5,893,226 A | * | 4/1999 | Sophocleous et al. | 40/591 |
| 6,178,915 B1 | | 1/2001 | Salandra | |
| 6,428,185 B1 | * | 8/2002 | Lin | 362/253 |
| 6,435,127 B1 | * | 8/2002 | Saviano et al. | 116/28 R |
| 6,523,778 B2 | | 2/2003 | Key et al. | |
| D476,589 S | | 7/2003 | Blake | |
| 6,804,905 B1 | * | 10/2004 | Burger et al. | 40/610 |
| 6,963,275 B2 | | 11/2005 | Smalls | |
| 7,621,650 B2 | * | 11/2009 | Nalitchaev et al. | 362/96 |
| 7,836,619 B2 | * | 11/2010 | Coutts | 40/218 |
| 7,876,208 B2 | | 1/2011 | Trevisi | |
| 2013/0047477 A1 | * | 2/2013 | Conner | 40/412 |

FOREIGN PATENT DOCUMENTS

| | | | | | |
|---|---|---|---|---|---|
| JP | 2000132130 A | * | 5/2000 | | G09F 19/00 |
| JP | 2005258444 A | * | 9/2005 | | G09F 19/00 |
| JP | 2008299300 A | * | 12/2008 | | G09F 19/00 |
| KR | 840194 B1 | * | 6/2008 | | G09F 19/02 |
| KR | 445507 Y1 | * | 8/2009 | | G09F 19/02 |
| WO | WO 9947853 A1 | * | 9/1999 | | F21P 1/04 |

* cited by examiner

*Primary Examiner* — R. A. Smith

(57) ABSTRACT

An emergency balloon system for alerting motorists to a stopped vehicle on a roadway featuring a base with a fan and lights, and a balloon component attached to the top of the base. The balloon has a reflective coating, a distress message, and reflective bars on its outer surface. When activated, the fan blows air into the balloon component to extend it upwardly. The system can be placed on a roadway or on a vehicle or any other appropriate location.

14 Claims, 4 Drawing Sheets

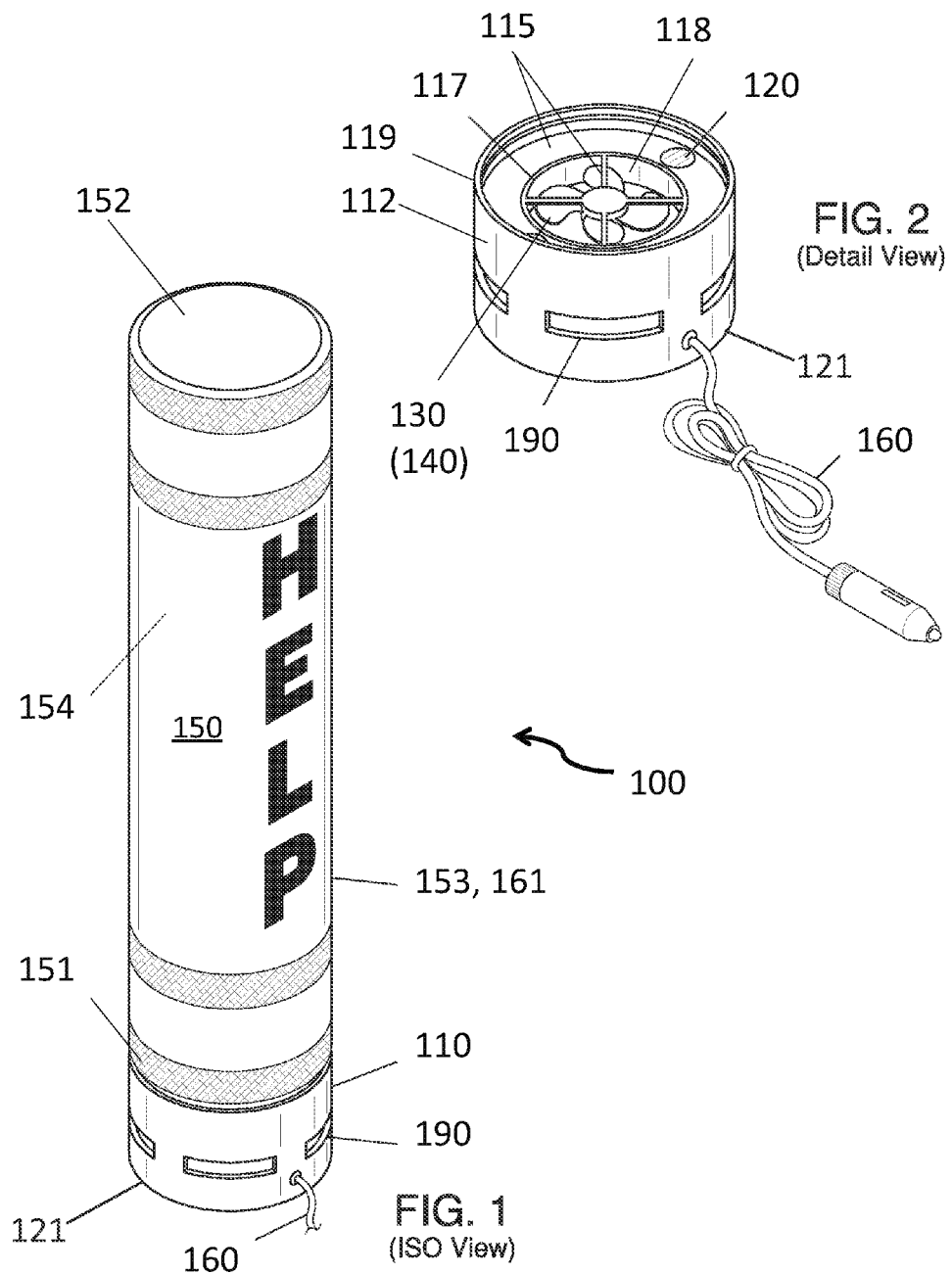

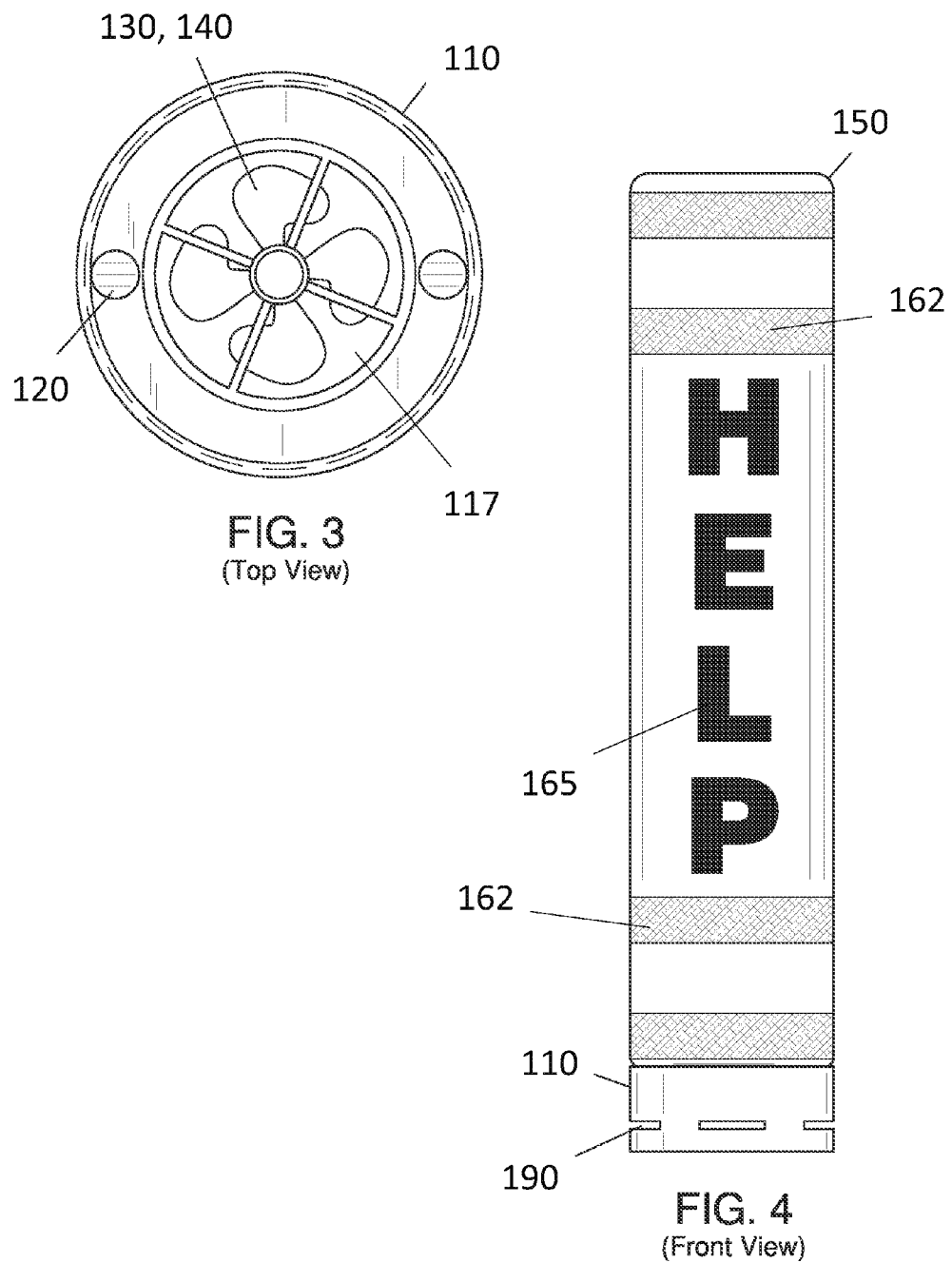

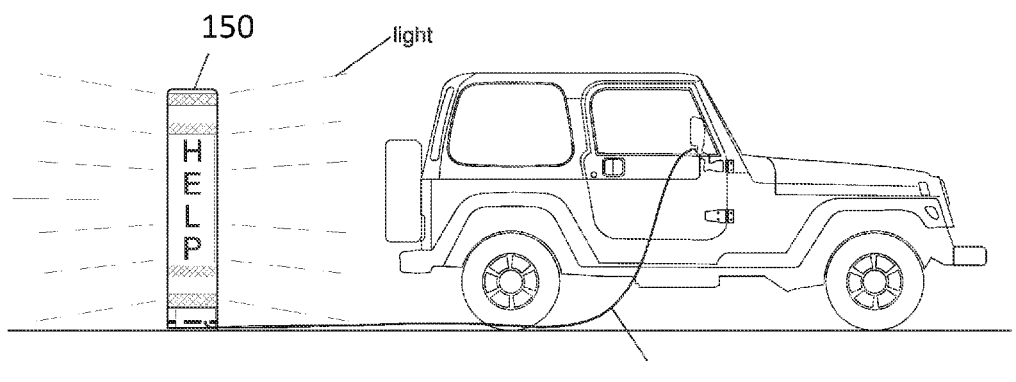
FIG. 5
(In-use View)

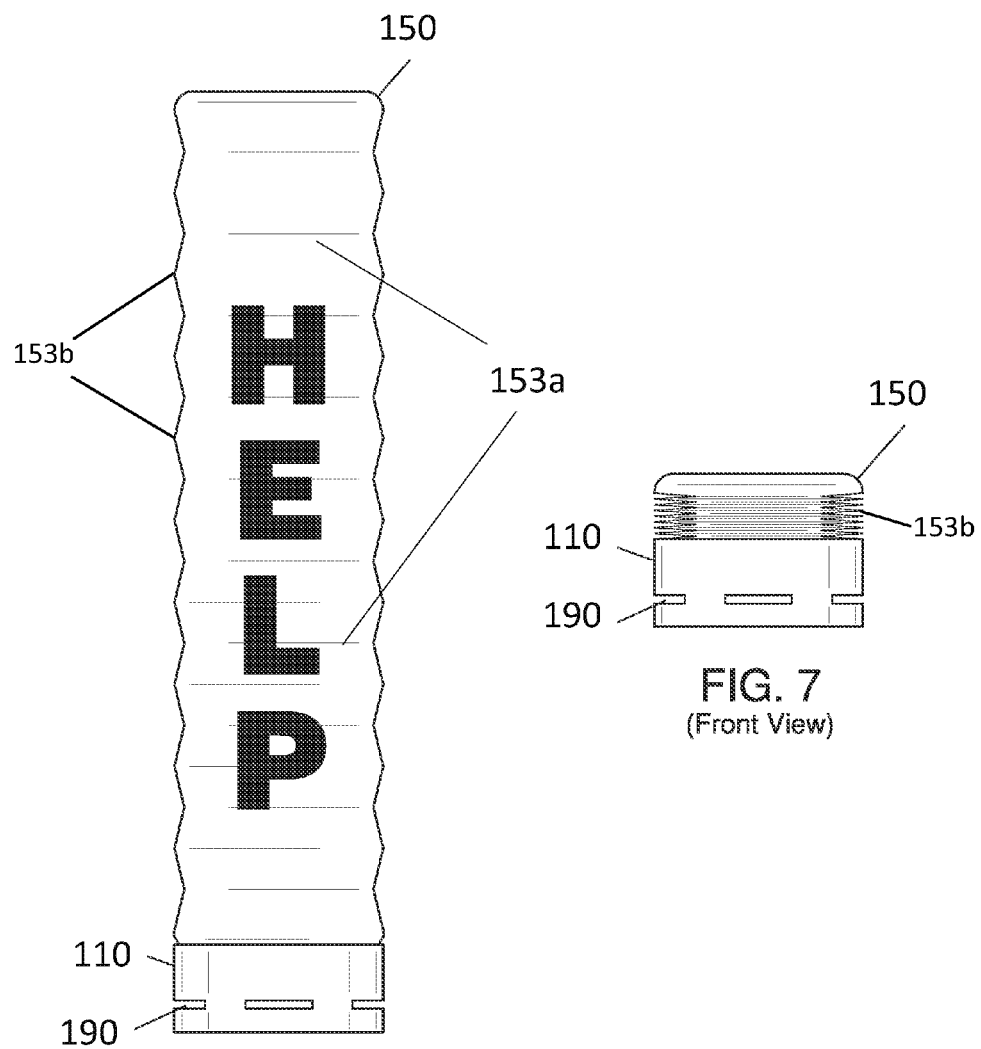

US 8,935,988 B1

EMERGENCY BALLOON SYSTEM FOR ROADS

BACKGROUND OF THE INVENTION

Motorists may find themselves in an emergency and having to pull off to the side of the road. Unfortunately, accidents may occur when motorists are in this position. The present invention features an emergency balloon system warning other drivers of the presence of the stopped car. The system can also let other drivers know that the driver of the stopped vehicle may be in need of assistance. The system is highly visible and can be seen day or night. The system may help prevent accidents.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is a perspective view of the system of the present invention.

FIG. 2 is a detailed view of the system of the present invention.

FIG. 3 is a top view of the system of the present invention.

FIG. 4 is a front view of the system of the present invention.

FIG. 5 is an in-use view of the system of the present invention.

FIG. 6 is a front view of an alternative embodiment of the system of the present invention.

FIG. 7 is a front view of an alternative embodiment of the system of the present invention.

DESCRIPTION OF PREFERRED EMBODIMENTS

Referring now to FIG. 1-7, the present invention features an emergency balloon system (100) for warning other drivers of the presence of a stopped car. The system (100) can also let other drivers know that the driver of the stopped vehicle may be in need of assistance. The system (100) can be placed next to (e.g., behind) a stopped vehicle, as shown in FIG. 5. The system (100) can be placed in any other appropriate location, even on top of a vehicle if desired.

The system (100) of the present invention comprises a base (110) that houses a fan (130). The base (110) has a base side wall (112) with a top edge (119), an inner cavity (118), and a top surface (115). The fan (130) is housed in the inner cavity (118) of the base (110). At least one space (117) is disposed in the top surface (115) of the base (110) to allow passage of air from the inner cavity (118) through the top surface (115), e.g., via the fan (130). For example, in some embodiments, the top surface (115) of the base (110) is X-shaped, e.g., as shown in FIG. 3. The top surface (115) of the base (110) and the spaces (117) are not limited to the aforementioned configuration. For example, in some embodiments, the top surface (115) of the base (110) has a mesh configuration. The fan (130) faces upwardly so as to blow air through the space (117) in the top surface (115) of the base (110).

A motor (140) is operatively connected to the fan (130). The motor (140) is adapted to rotate the fan (130) in a first direction or a second direction in a standard manner.

An air intake aperture (190), e.g., a vent, is disposed in the base side wall (112) of the base (110) and is fluidly connected to the inner cavity (118) of the base (110). The air intake aperture (190) is positioned below the top edge (119) of the base (110) and below the fan (130). The air intake aperture (190) allows the fan (130) to draw air from outside to be blown through the space (117) in the base (110).

A balloon component (150) is connected to the base (110). The balloon component (150) has a first end (151), a second end (152), an outer wall (153), and a hollow inner cavity (154). The first end (151) has an opening that is fluidly connected to the inner cavity (154) (e.g., air can enter into the inner cavity via the opening). The second end (152) is sealed.

The first end (151) of the balloon component (150) is attached to the top edge (119) of the base outer wall (112) of the base (110). When the fan (130) is activated, the fan (130) blows air through the opening into the inner cavity (154) of the balloon component (150) to inflate the balloon component (150) and extend it upwardly away from the base (110) in a vertical position (see FIG. 5).

The outer wall (153) of the balloon component (150), e.g., all or a portion thereof, has a color. For example, in some embodiments, all or a portion of the outer wall (153) of the balloon component (156) is red, orange, yellow, or any other appropriate color. A reflective coating (161), e.g., a fluorescent coating, is disposed on at least a portion of the outer wall (153) of the balloon component (150). A distress message (165) is written on the outer wall (153) of the balloon component (150). At least one reflective bar (162) is disposed on the outer wall (153) above the distress message (165) and at least one reflective bar (162) is disposed on the outer wall (153) below the distress message (165).

The balloon component (150) can move between an inflated position (see FIG. 5, FIG. 6) and a deflated position (see FIG. 7). In some embodiments, the balloon component is a cylinder (e.g., the outer wall is the shaft of the cylinder). In some embodiments, (as shown in FIGS. 6 and 7), the shaft of the cylinder comprises accordion pleats (153a) such that the cylinder is collapsible in a first position (the deflated position) when there is no air blown into it and the cylinder is expanded to a second position (an inflated position) when there is air blown into it.

A light component (120) is disposed on the base (110). The light component (120) emits light, for example upwardly in the direction of the balloon component (150). In some embodiments, the light component (120) is disposed in the inner cavity (118) of the base (110) and faces upwardly to emit light through the space (117) in the top surface (115) of the base (110). In some embodiments, the light component (120) is disposed on the top surface (115) of the base (110) and faces upwardly to emit light through the balloon component (150).

The system (100) of the present invention may be constructed in a variety of shapes and sizes. For example, in some embodiments, the balloon component (150) is between about 40 and 80 inches in height as measured from the first end (151) to the second end (152). In some embodiments, the balloon component (150) is between about 60 and 90 inches in height as measured from the first end (151) to the second end (152). In some embodiments, the balloon component (150) is more than about 90 inches in height as measured from the first end (151) to the second end (152). The present invention is not limited to the aforementioned dimensions.

The system (100) may comprise a power cord (160) for operatively connecting the motor (140) to a power source. For example, in some embodiments, the power cord (160) is a 12V power cord for insertion into a 12V plug of a vehicle. In some embodiments, the motor (140) is operatively connected to a battery (e.g., a rechargeable battery).

As used herein, the term "about" refers to plus or minus 10% of the referenced number.

The disclosures of the following U.S. Patents are incorporated in their entirety by reference herein: U.S. Pat. No. 5,117,344; U.S. Pat. No. 6,523,778; U.S. Pat. No. 6,178,915; U.S. Pat. No. 6,963,275; U.S. Pat. No. 7,876,208; U.S. Design Pat. No. D476,589.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An emergency balloon system (100) for alerting motorists to a stopped vehicle on a roadway, said system (100) comprising:
   (a) a cylindrical base (110) having a base side wall (112) with a top edge (119) and a bottom edge (121), an inner cavity (118), and a top surface (115), wherein at least one space (117) is disposed in the top surface (115) allowing passage of air from the inner cavity (118) through the top surface (115);
   (b) a fan (130) disposed in the inner cavity (118) of the base (110), the fan (130) faces upwardly so as to blow air through the space (117) in the top surface (115) of the base (110);
   (c) a motor (140) operatively connected to the fan (130), the motor (140) is adapted to rotate the fan (130) in a first direction or a second direction;
   (d) an air intake aperture (190) disposed in the base side wall (112) of the base (110) and fluidly connected to the inner cavity (118) of the base (110), the air intake aperture (190) is positioned between the top edge (119) and bottom edge (121) of the base (110), the air intake aperture (190) is positioned below the top edge (119) of the base (110) and below the fan (130), the air intake aperture (190) allows the fan (130) to draw air from outside to be blown through the space (117) in the base (110);
   (e) a balloon component (150) having a first end (151), a second end (152), an outer wall (153), and a hollow inner cavity (154), the first end (151) has an opening that is fluidly connected to the inner cavity (154), the second end (152) is sealed, the outer wall (153) of the balloon component (150) has a color, a reflective coating (161) is disposed on at least a portion of the outer wall (153) of the balloon component (150), a distress message (165) is written on the outer wall (153) of the balloon component (150), and at least one reflective bar (162) is disposed on the outer wall (153) above the distress message (165) and at least one reflective bar (162) is disposed on the outer wall (153) below the distress message (165), wherein the first end (151) of the balloon component (150) is attached to the top edge (119) of the base outer wall (112) of the base (110), wherein when the fan (130) is activated the fan (130) blows air through the opening into the inner cavity (154) of the balloon component (150) to inflate the balloon component (150) and extend it upwardly away from the base (110) in a vertical position;
   wherein the balloon component (150) is a cylinder, the outer wall (153) being a shaft of the cylinder, the shaft of the cylinder comprising a plurality of accordion pleats (153a) such that the cylinder is collapsible in a first position when there is no air blown into it and the cylinder is expanded to a second position when there is air blown into it, wherein each accordion pleat (153a) has a pleat tip (153b), wherein each pleat tip (153b) extends up to and stops at the base side wall (112) such that at each pleat tip (153b), the outer wall (153) of the cylinder and the cylindrical base (110) have equal circumferences; and
   (f) a light component (120) disposed on the base (110), the light component (120) emits light upwardly in the direction of the balloon component (150).

2. The system (100) of claim 1, wherein the top surface (115) of the base (110) is X-shaped.

3. The system (100) of claim 1, wherein the top surface (115) of the base (110) comprises mesh.

4. The system (100) of claim 1, wherein the color of the outer wall (153) of the balloon component (150) is red.

5. The system (100) of claim 1, wherein the balloon component (150) is between about 40 and 80 inches in height as measured from the first end (151) to the second end (152).

6. The system (100) of claim 1, wherein the balloon component (150) is between about 60 and 90 inches in height as measured from the first end (151) to the second end (152).

7. The system (100) of claim 1, wherein the balloon component (150) is more than about 90 inches in height as measured from the first end (151) to the second end (152).

8. The system (100) of claim 1 further comprising a power cord (160) for operatively connecting the motor (140) to a power source.

9. The system (100) of claim 8, wherein the power cord (160) is a 12V power cord for insertion into a 12V plug of a vehicle.

10. The system (100) of claim 9, wherein the battery is a rechargeable battery.

11. The system (100) of claim 9, wherein the light component (120) is disposed in the inner cavity (118) of the base (110), the light component (120) faces upwardly to emit light through the space (117) in the top surface (115) of the base (110).

12. The system (100) of claim 9, wherein the light component (120) is disposed on the top surface (115) of the base (110), the light component (120) faces upwardly to emit light through the balloon component (150).

13. The system (100) of claim 1, wherein the motor (140) is operatively connected to a battery.

14. An emergency balloon system (100) for alerting motorists to a stopped vehicle on a roadway, said system (100) consisting of:
   (a) a cylindrical base (110) having a base side wall (112) with a top edge (119) and a bottom edge (121), an inner cavity (118), and a top surface (115), wherein at least one space (117) is disposed in the top surface (115) allowing passage of air from the inner cavity (118) through the top surface (115);

(b) a fan (130) disposed in the inner cavity (118) of the base (110), the fan (130) faces upwardly so as to blow air through the space (117) in the top surface (115) of the base (110);

(c) a motor (140) operatively connected to the fan (130), the motor (140) is adapted to rotate the fan (130) in a first direction or a second direction;

(d) an air intake aperture (190) disposed in the base side wall (112) of the base (110) and fluidly connected to the inner cavity (118) of the base (110), the air intake aperture (190) is positioned between the top edge (119) and bottom edge (121) of the base (110), the air intake aperture (190) is positioned below the top edge (119) of the base (110) and below the fan (130), the air intake aperture (190) allows the fan (130) to draw air from outside to be blown through the space (117) in the base (110);

(e) a balloon component (150) having a first end (151), a second end (152), an outer wall (153), and a hollow inner cavity (154), the first end (151) has an opening that is fluidly connected to the inner cavity (154), the second end (152) is sealed, the outer wall (153) of the balloon component (150) has a color, a reflective coating (161) is disposed on at least a portion of the outer wall (153) of the balloon component (150), a distress message (165) is written on the outer wall (153) of the balloon component (150), and at least one reflective bar (162) is disposed on the outer wall (153) above the distress message (165) and at least one reflective bar (162) is disposed on the outer wall (153) below the distress message (165), wherein the first end (151) of the balloon component (150) is attached to the top edge (119) of the base outer wall (112) of the base (110), wherein when the fan (130) is activated the fan (130) blows air through the opening into the inner cavity (154) of the balloon component (150) to inflate the balloon component (150) and extend it upwardly away from the base (110) in a vertical position;

wherein the balloon component (150) is a cylinder, the outer wall (153) being a shaft of the cylinder, the shaft of the cylinder consisting of a plurality of accordion pleats (153a) such that the cylinder is collapsible in a first position when there is no air blown into it and the cylinder is expanded to a second position when there is air blown into it, wherein each accordion pleat (153a) has a pleat tip (153b), wherein each pleat tip (153b) extends up to and stops at the base side wall (112) such that at each pleat tip (153b), the outer wall (153) of the cylinder and the cylindrical base (110) have equal circumferences; and (f) a light component (120) disposed on the base (110), the light component (120) emits light upwardly in the direction of the balloon component (150).

* * * * *